Jan. 2, 1940.　　　　　M. EATON　　　　　2,185,786
MEANS FOR REGULATING ELECTRIC STEAM GENERATORS
Filed Nov. 28, 1938　　　　4 Sheets-Sheet 4

Inventor
Milton Eaton
By
Alan Awakey
Attorney.

Patented Jan. 2, 1940

2,185,786

UNITED STATES PATENT OFFICE 2,185,786

MEANS FOR REGULATING ELECTRIC STEAM GENERATORS

Milton Eaton, Shawinigan Falls, Quebec, Canada, assignor to Shawinigan Chemicals Limited, Montreal, Quebec, Canada, a corporation of Canada Application November 28, 1938, Serial No. 242,827
In Canada November 8, 1938

24 Claims. (Cl. 219—40)

This invention relates to improvements in means for regulating electric steam generators.

More specifically it relates to apparatus for the regulation of electric steam generators of the single compartment electrode type referred to briefly as electric boilers or boilers and described in my United States Patents Nos. 1,902,842, granted March 28, 1933, and 2,006,631, granted July 2, 1935.

OBJECTS

It is a principal object of the invention to provide a system for automatically regulating the rate of evaporation, that is the power input, in boilers of this type in response to deviations in a condition of operation, which it is desired to maintain constant and which will thus be referred to as the selected condition. This selected condition, of which the power input to the boiler is, according to the invention, a determining factor, may be, alternatively, a constant adjustable boiler pressure, a constant adjustable power input, or a constant total power demand as will become evident from the detailed description to follow.

It is a further object of the invention to provide in combination with this system, means for limiting the current that can be taken at any boiler water level, independently of the selected condition.

With these and other objects in view, the present system is featured by novel regulating means for adjusting the power input (i. e., rate of evaporation) in response to variations in the selected condition (or deviations from the control point of the selected condition), through automatic step by step variation of the water level on the boiler electrodes. Electrical controlling means is provided, having a timed holding circuit for timing the operation of the regulating means to accomplish the step by step variation.

DRAWINGS

Other aspects of the invention will become evident from the following description of one of its preferred embodiments shown in the accompanying drawings, in which.

DETAILED DESCRIPTION

The boiler

Figures 1, 2:
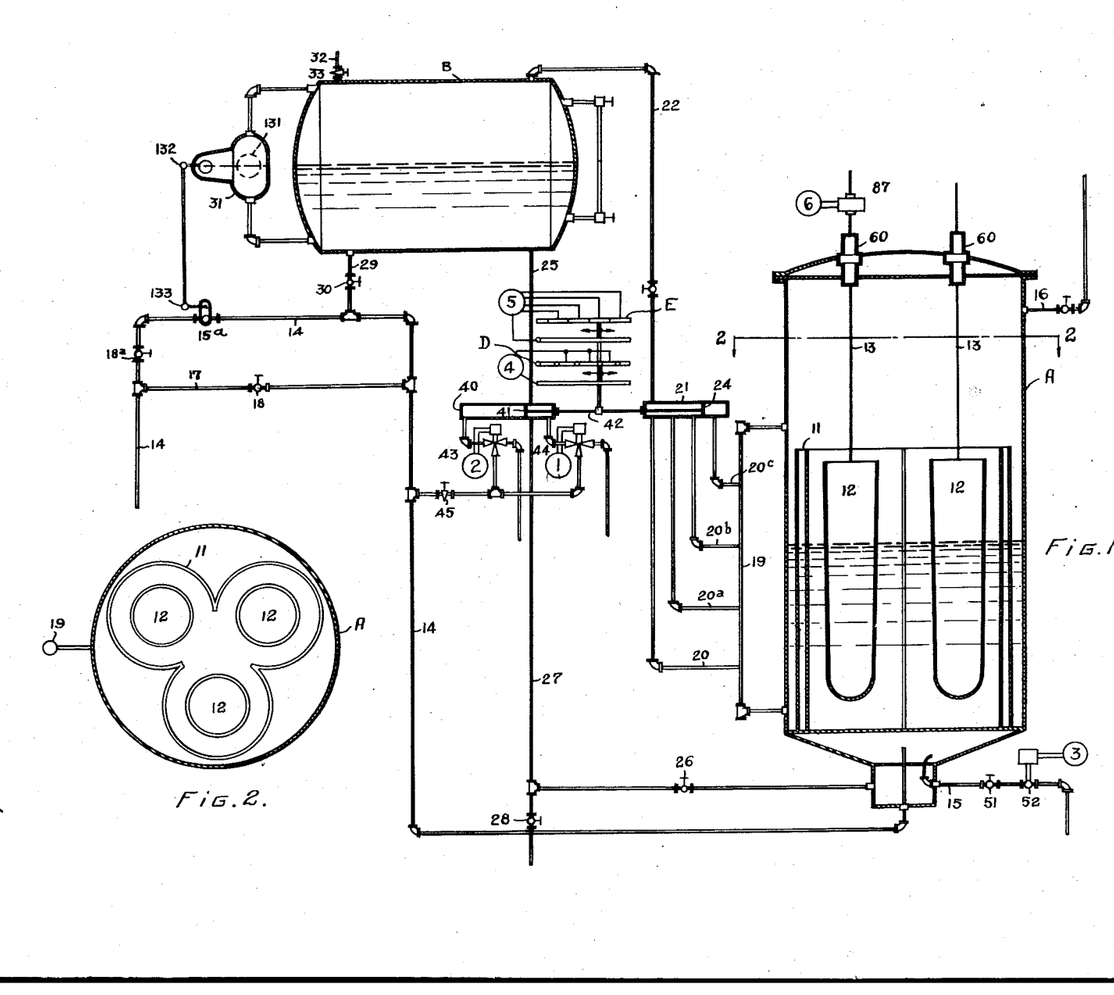
Figure 1 is a diagram illustrating the arrangement of special mechanical apparatus associated with a three-electrode boiler in which the electrodes are each connected to a phase of a power supply.
Figure 2 is a cross section along the line 2—2 of Figure 1.

Referring more specifically to the drawings, A represents the shell of an electric boiler of established design. Within the shell A and insulated therefrom by insulators 60 are three electrodes 12, and means of conducting electric current into the electrodes, including conductors 13. 14 is an inlet pipe for feed water, 15 is a bleed connection, and 16 a steam outlet. An internal shell 11, connected with the outer shell A, constitutes a grounded neutral to the electrodes. Water is shown in the boiler A partially immersing the electrodes 12.

The boiler is supplied with water from the feed water line 14 through a main regulating valve 15a controlled by a float mechanism 31. The valve 15a is operated by float 131 (in float chamber 31) communicating with an elevated control tank B and interconnected lever arms 132 and 133, actuated in a manner to be described, so as to maintain the water level in the boiler and control tank, under ordinary conditions, approximately at a constant level. A bypass 17 is provided to bypass the regulating valve 15a and is controlled by a manually operable valve 18. A valve 18a is positioned in the feed water line 14 between the bypass 17 and the valve 15a.

Fundamental boiler operation

In operation of the boiler, the electric current, passing through the water surrounding the electrodes 12, generates heat energy which is dissipated in raising steam. The neutral shell 11 obtains substantially uniform current density on the surface of the electrodes and avoids electrolytic corrosion of the outer shell.

In a boiler of this type, the applied voltage is constant and the power input, i. e., rate of evaporation, is regulated by varying the current, the latter being governed by the resistance of its path through the water. This resistance depends on three factors, namely, (1) the specific resistance and temperature of the boiler water, (2) the cross sectional area of the path of the current through it, and (3) its mean length. The specific resistance is determined by the concentration of salts in solution. The cross sectional area of the path of the current varies with the water level on the electrodes. The electrode spacing (the distance between one another and neutral shell) determines the distance the current must travel through the water. Thus, the power input is directly proportional to the electrode area immersed, and to the salt concentration in the water. The salt concentration tends to increase due to salts carried into the boiler by the feed water and is held within satisfactory limits by continuous or intermittent bleeding. As boiler water is bled off, it is replaced with comparatively pure feed water and hence the salt concentration in the water becomes diluted.

The power input may be controlled in three ways, namely, (a) by varying the water level on the electrodes with the salt concentration maintained substantially constant, (b) by using a salt solution to vary the salt concentration, with the water level maintained substantially constant, or (c) by a combination of these two methods.

The present system

According to the present invention, the power input, and hence the selected condition of which it is a factor, are automatically regulated by varying the water level on the electrodes (according to (a) previous paragraph) with the aid of a regulating and control system to be described in detail. The salt concentration is held within predetermined limits by automatically regulating the bleeding off of boiler water by means of elements forming a part of this system when the load current at any water level becomes greater than normal for that level. Through the arrangement of the system referred to, variation of the water level on the electrodes is made responsive to the controlled condition, whereas the limitation of the salt concentration is independent of it.

This system offers advantages, as compared with those disclosed in the prior art. For instance, it is not limited in its application either by the choice of condition desired to be regulated, or by boiler load conditions such as degree of fluctuation in steam demand, and feed water conductivity. In fact, there is no other automatic control equipment available for application to the type of boiler referred to, which will vary the boiler load over its full range and in such a manner as to maintain constant total power demand, i. e., boiler power plus motor power, held constant. A further advantage is obtained in the use of step by step correction with intervening pauses to allow time for response. This tends to avoid hunting and provides for stability.

REGULATION

The control tank and boiler

Having dealt generally with the principles underlying the present invention by reference to a conventional boiler, more detailed attention will now be given to the regulating system mentioned. In this system, as an adjunct to boiler water level regulation, a water column 19 is associated with the boiler shell 11 and a series of pipes 20, 20a, 20b and 20c, connects different levels of the column 19 with corresponding positions spaced along a cylinder 21. A pipe 22 connects the cylinder 21 at a point directly opposite the connection of pipe 20, corresponding with the lowest water level, with the top of an elevated control tank B. The connections to the water column correspond with the highest and lowest practicable water levels on the electrodes and equally spaced intermediate levels, the spacing of the pipes 20, 20a, etc., and hence their number, being arbitrary. The use of six levels has been found satisfactory. A piston 24 operates in the cylinder to connect or shut off the pipe 22 progressively from the pipes 20, 20a, 20b, etc., so that various levels in the boiler may be connected to the top of the control tank. A pipe 25 connects the bottom of the control tank to the bottom of the boiler, this pipe being controlled by a valve 26. An outlet 27 is provided to the pipe 25 and is controlled by a valve 28. The bottom of the control tank is connected to the feed water line 14 through a pipe 29 controlled by a valve 30.

The float mechanism 31, connected with the control tank at mid elevation, controls the feed water regulator valve 15a, increasing or decreasing its opening as the water level in the tank falls or rises respectively. Alternatively, a thermostatic type of regulator, such as a "Cope's" feedwater regulator, might be used if desired, instead of the float type.

The control tank is also provided with a bleed connection 32 controlled by a needle valve 33. The steam on entering the control tank is condensed and consequently entrained permanent gases tend to accumulate. Excessive accumulation is avoided by a light continuous bleed through needle valve 33. The gases are mixed with the steam, hence both steam and gases are bled off. The concentration of gases is limited by the rate of bleed which need not be greater than 1 cubic foot in 10 to 15 minutes, depending on the proportion of gases in the steam and rate of condensation, e. g., assuming the proportion of gases in the steam to be 30 parts per million and rate of condensation 10 cubic feet per minute a bleed of 1 cubic foot in 15 minutes limits the concentration to one half of one per cent (0.5%) which would not be objectionable.

This control tank and boiler arrangement and its function as described are believed to constitute a new development in the art.

Water level selecting apparatus

For actuating the piston 24 there is provided, adjacent the cylinder 21 and in axial alignment therewith, another cylinder 40 in which is mounted a piston 41. The pistons 24 and 41 are inter-connected by a piston rod 42 extending through the ends of the respective cylinders. Different ends of the cylinder 40 are connected through suitable pipes with three-way solenoid operated valves 43 and 44, the circles 2 and 1 denoting connections with the control system, to be described later, from the solenoids of these valves. These valves are connected with the feed water supply pipe 14 or any other suitable source of hydraulic pressure through a throttling valve 45. The valve port openings are such that hydraulic pressure is normally applied to both ends of the cylinder 40. If, however, the valve 44 is energized, pressure to the corresponding end of the cylinder 40 is cut off and the water in that end is released through a third port in the valve. This causes the pistons 41 and 24 to move to the right. Similarly, if the valve 43 is energized, these pistons move to the left. The piston speed is adjusted by means of the throttling valve 45. The valves 43 and 44 are controlled by the electrical control system with which the solenoids of these valves are connected.

To further assist in automatic boiler water level regulation and for adjusting the concentration of salts in the solution, the bleed water line 15 is regulated by a manually regulated valve 51 and by a solenoid operated valve 52. The solenoid of the valve 52 is connected (the circle 3 indicating this connection) in a circuit of the electrical control system by which it is controlled. Alternatively, the valve 52 may be motor operated.

Feed water regulation

For a better understanding of the function of the apparatus already described, before the details of the electrical control system are dealt with, reference will now be made to feed water regulation under normal conditions while the selected condition remains unchanged.

When steam is permitted to rise in the conduit 22, e. g., when the position of the piston 24, is to the right of one or more of the conduits 20, 20a, etc., above the boiler water level—water flows from the control tank to the boiler by gravity through pipe 25, the rate of flow depending upon the pipe resistance. If access of steam to conduit 22 is cut off, e. g., by the piston 24 being to the left of all the conduits 20, 20a, etc., above the water level, the direction of flow in the conduit 25 reverses, the rate of flow depending upon the rate of condensation in the control tank. Steam is used in supplying radiation losses and in raising the temperature of water taken from the bottom of the boiler. If the resulting rate of condensation is not fast enough, it may be increased by admitting relatively cool feed water directly to the control tank through the valve 30, the rate depending upon the throttling adjustment of this valve.

In this arrangement, access of steam to conduit 22 and the control tank 19 depends on the position of the piston 24 in the cylinder 21 in conjunction with the water level in the boiler. As shown in the diagram of Figure 1, if the boiler water level rises any higher, access of steam to conduit 22 is cut off and, as condensation in the control tank B proceeds, pressure in it is maintained by transfer of water from the boiler through pipe 25. As the water level in the tank rises, the float mechanism 31 reduces the opening of the valve 15a, thus decreasing the rate of feed water flow to the boiler through pipe 14. When the boiler water level has fallen below the conduit 20b, steam is again admitted to the control tank through the pipes 20b and 22; gravity flow to the boiler through pipe 25 is thus resumed. As the control tank water level falls, the opening of the feed water regulator valve 15a is increased, thus accelerating the feed water flow through pipe 14. The boiler water level again rises and the above cycle is repeated. In this manner, although the feed water passes directly to the boiler through the pipe 14, its rate of flow is directly dependent upon the water level in the control tank B, which in turn depends upon conditions within the boiler itself.

It is essential that the feedwater regulator should function to keep the control tank half full; there is then water stored for raising the level in the boiler and space for transfer of water to drop the level in the boiler.

Selection of water level

When it is desired to increase the power input of the boiler, as for instance to return the selected condition to normal, the piston 24 is moved to the right, permitting access of steam from pipes of the series 20, 20a, etc., at higher water levels on the water column, causing adjustment of the water through the regulating apparatus described, to a higher level. Similarly, if it is desired to decrease the power input, the piston 24 is moved to the left and the water in the boiler subsequently adjusts itself to a lower level. The selection of a water level in this manner is believed to be novel.

CONTROL

Governing instrument

The control system, as will eventually be described in greater detail, controls the movements of the piston 24 and, consequently, is instrumental in causing the changes in the boiler power input. This system is set in operation, to vary the boiler water level, by a governing instrument 70. Since this instrument responds to variations in the selected condition, its nature depends upon the condition selected. For instance, if this condition is one of constant adjustable boiler pressure, the instrument is a pressure actuated device connected mechanically with the boiler. If it is desired to maintain constant adjustable power input the governing instrument is a manual device, used to adjust the boiler water level to correspond with the desired power input.

When it is required that the control should function to maintain constant power input to the boiler, governing instrument 70 is a manual pushbutton station used to adjust the boiler water level to correspond with the desired load. Instrumentalities associated with the control system then function, as described later, to maintain the load current, or power input, corresponding with the water level. These instrumentalities may be adjusted to maintain any predetermined load corresponding with a fixed water level, within the limits of permissible current density.

Alternatively, it may be desired to maintain constant total power demand, i. e., boiler power plus motor and other power, possibly equal to the maximum demand on which the contract with the power company is based. In this case the control instrument 70 will be a contact-making wattmeter located in the circuit supplying the boiler power and all other power, such as that required for motors, lighting, etc. This will cause the boiler power to be increased or decreased as the motor and other power falls and rises.

A principal advantage of the present system is that it is not limited in its application either by the selected condition desired to be regulated, or by boiler load conditions. It should be noted, however, that when the control equipment is used to maintain either constant power input to the boiler, or constant total power demand, the steam pressure must be governed by a coal fired boiler or boilers, operated with the electric boiler, or by other suitable means. The coal fired boiler or boilers supply the excess of steam demand over that supplied by the electric boiler, hence the coal boiler must regulate the steam pressure.

The piston-travel limit switch

Once the movement of the piston 24 has been started by the governing instrument, it is desirable that this movement continue for a definite distance, for instance, the distance between a pair of the pipes 20a, 20b, etc. For this purpose there is provided in conjunction with the control system, to which it is connected through a connection indicated by the circle 4, a limit switch D operable by the piston rod 42. One side of the limit switch D comprises alternate segments 82 and 83 (Figure 3) of conducting material insulated from one another, the segments 82 being connected to a conductor 84 leading to the control system. At the other side of the limit switch is a conducting rod or bar 85 connected to a conductor 86 also leading to the control system. This switch also includes a contact arm 81 contacting the segments 82 and 83 and the conducting rod 85, this contact arm being operatively connected to the centre part of the piston rod 42. The distance between the insulated non-interconnected segments 83 of the limit switch, referred to as "stop segments", is the same as the spacing of the pipes 20, 20a, etc., connected with the cylinder 21. In addition, the piston 24 and the contact arm 81 have a space relation, such that when the contact arm engages a stop segment 83, the piston 24 is midway between two adjacent pipe connections 20, 20a, etc. The operation of this limit switch will be described in conjunction with that of the control system.

The tap selector switch

Figure 3:
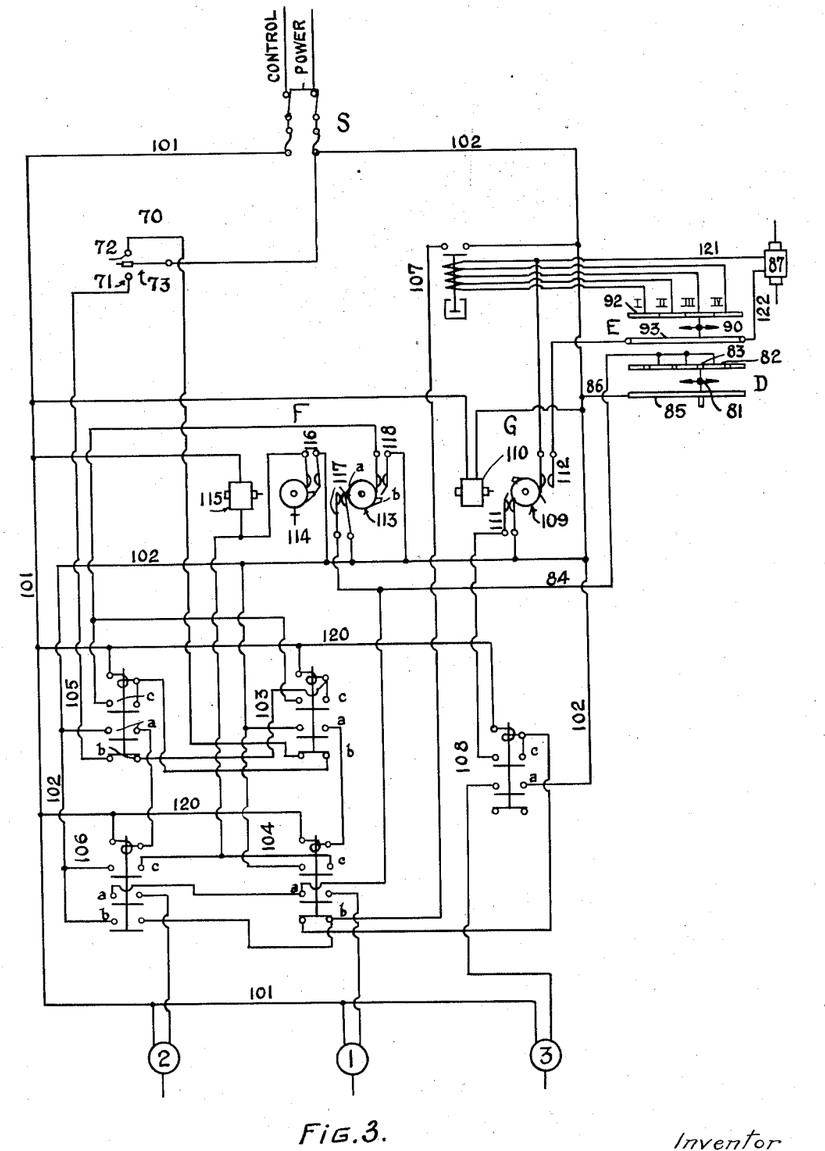
Figure 3 is a wiring diagram illustrating an electrical system for controlling the apparatus shown in Figure 1.

To limit the amount of current that can be taken at any boiler water level, independently of the selected condition, there is provided for operation in conjunction with the control system a tap selector switch E, also actuable from the piston rod 42. The two sides of the switch E are similar to those of the limit switch D, adjacent segments of one side being connected to solenoid taps on an overcurrent relay. The switch E includes a contact arm 90 contacting the segments and contact bar of the switch in such a manner that when the contact arm of the limit switch is moved from one stop segment to the next in either direction by the piston rod 42, the contact arm 90 of the tap selector switch moves from the centre of one segment to the centre of an adjacent one. Through connections illustrated by the circle 5, the tap selector switch E, is connected to the control circuit and to the transformer 87, as best illustrated in Figure 3. The manner of operation of this switch will also be described later in conjunction with the control system.

Electrical control circuits

Figure 4:
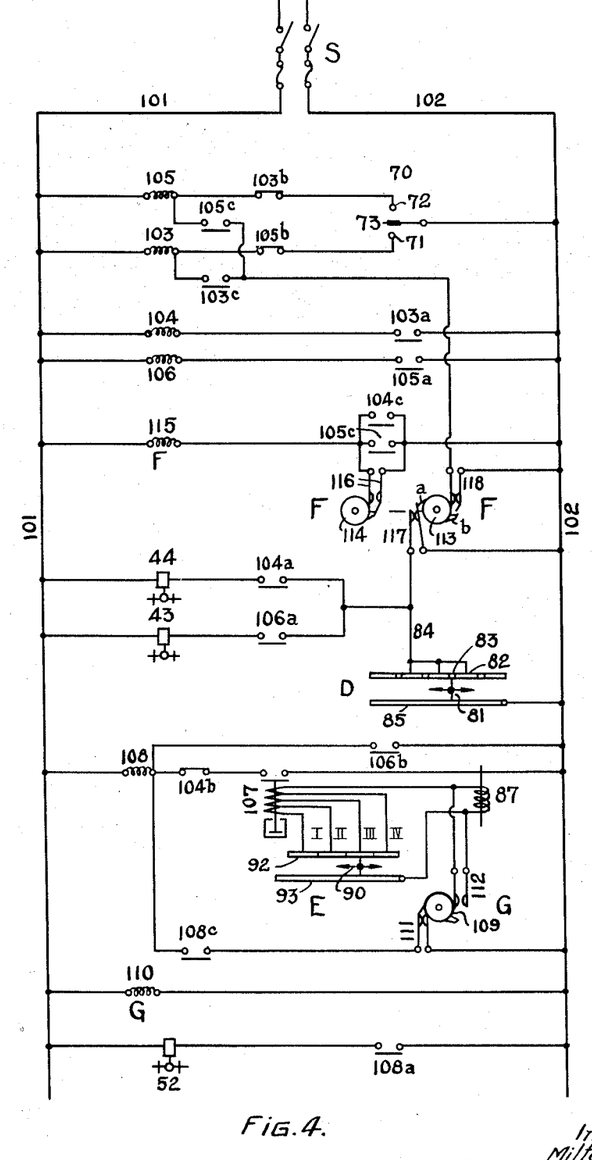
Figure 4 is a schematic wiring diagram of the system illustrated in Figure 3.
Figure 5:
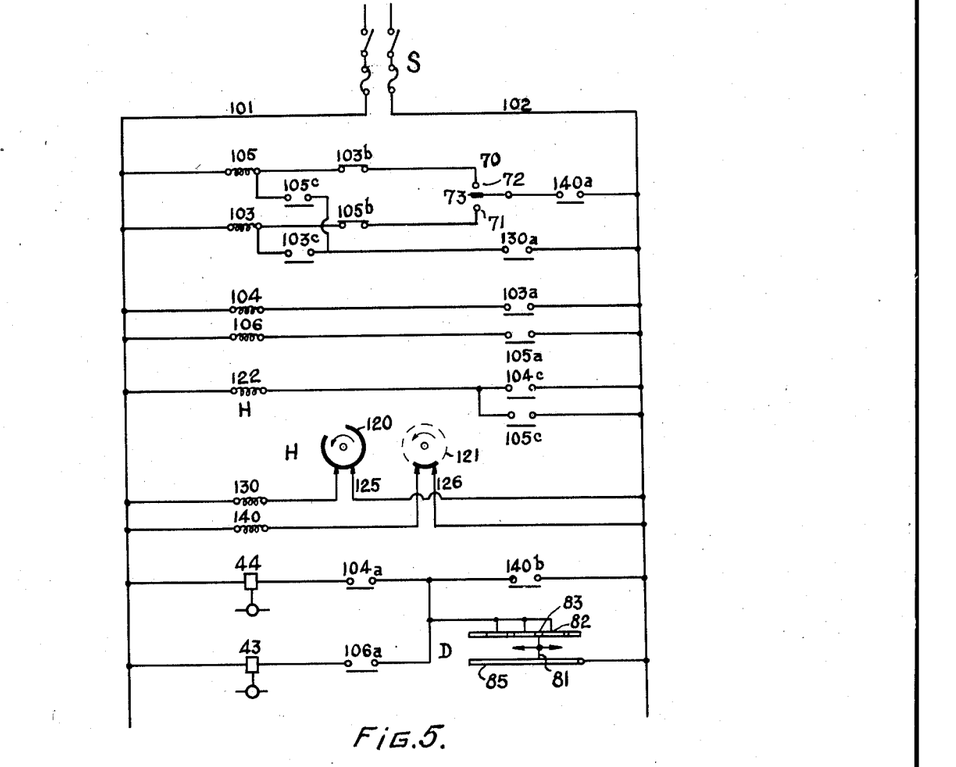
Figure 5 is a fragmentary schematic diagram similar to Figure 4, illustrating the use of an alternative form of timing means for the control circuits.

As illustrated diagrammatically in Figure 3, and schematically in Figures 4 and 5, the electrical control system includes a circuit having conductors 101 and 102 connectable to a suitable power supply source through a switch S. For utilizing this circuit to operate the valves 44, 43 and 52, the conductor 101 is connected directly to one terminal of the solenoid of each of these valves, while the other conductor 102 is connectable respectively to the other terminal of each of these solenoids through a suitable magnetic switch or relay, as will be described in detail. In Figure 3, the connections between the elements of the control system and the solenoids of the valves which they control are indicated by the circles 1, 2 and 3, which thus correspond to the similar circles in Figure 1.

Motor driven timers

According to one embodiment of the invention there is associated with the control system a timing device F including a motor 115 driving two cams 113 and 114 in a clockwise direction. As the cam 114 rotates it momentarily opens, in each revolution, a pair of contacts 116. The cam 113 causes alternatively a momentary opening between contacts 118 and a momentary closure between contacts 117. Cam lifts a and b of cam 113, and contacts 117 and 118, are offset so that lift a engages contacts 117 only and lift b engages contacts 118 only; contacts 118 are also made to momentarily open just before contacts 117 close. The motor and the cams rotate in synchronism but are normally at rest in their relative positions shown.

A similar apparatus G includes a motor 110 driving a cam 109, in each revolution of which a pair of contacts 111 are momentarily opened and a pair of contacts 112 are momentarily closed. The motor and cam rotate continuously.

Control relays

The relays referred to include a pair of relays 103 and 104 operating as one to control the valve 44, another pair of relays 105 and 106 operating as one to control the valve 43, a relay 108 controlling the bleed valve 52, and an overcurrent relay 107. The relays 103, 104 and 105 include respective, normally open, pairs of contacts 103a—103c, 104a—104c—etc., and normally closed pairs of contacts 103b, 104b, and 105b. Relay 106 includes three normally open pairs of contacts 106a, 106b, and 106c. Relay 108 has two pairs of normally open contacts 108a and 108c. The contacts of the overcurrent relay 107 are normally open.

Control circuit connections

The control circuit connections are best illustrated in the schematic diagram, Fig. 4. A switch S is used to connect conductors 101 and 102 with a suitable source of control power supply. One terminal of the solenoids of all relays, and valves, and one terminal of each motor is connected directly with conductor 101, with the exception of the solenoid of relay 107. The other terminals of these electrically operated devices are connectable with the other side of the control circuit, conductor 102, through the operation of relay contacts, limit switches, etc.

The solenoid of relay 105 is connected with contact 72 of governing instrument 70, through contacts 103b, also with one contact of the pair 105c, the other contact of which is connected with conductor 102 through contacts 118 of timing device F. The solenoid of relay 103 is similarly connected through contacts 105b with contact 71 of the governing instrument, and through contacts 103c with contact 118.

Contacts 103b and 105b thus serve as electrical interlocks making it impossible for relays 103 and 105 to be energized at the same time. Contacts 103c, 105c, and 118 of timer F, together with connections, constitute timed holding circuits, the function of which will be described later.

The circuit maker 73 of governing instrument 70 is connected directly to conductor 102.

The solenoids of relays 104 and 106 are connected with one contact of the pairs 103a and 105a respectively. The other contacts of these pairs are connected with conductor 102.

The motor 115 of the timer F is connectable with conductor 102 through the operation of contacts 104c, 105c, or contacts 116 of the timer F.

The solenoids of valves 44 and 43 are connected with one contact of the pairs 104a and 106a respectively. The other contacts of these pairs are connected together and with one contact of the pair 117 of timer F, also with conductor 84 leading to the interconnected segments of limit switch D. Element 85 of the limit switch and the other contact of the timer contacts 117, are connected with conductor 102.

The solenoid of relay 108 has three parallel circuits making it connectable with conductor 102. One leads through contacts 106b of relay 106, another through contacts 104b and the contacts of relay 107. The third circuit through contacts 108c and contacts 111 of timer G, is a holding circuit.

One solenoid terminal of overcurrent relay 107 is connected with one terminal of current transformer 87 located in one of the power connections to the boiler. Other solenoid taps 1, 2, 3, and 4 are connected with tap selector switch E. Contact element 93 of the tap selector switch is connected with the other current transformer terminal. The normally open contacts 112 of the timer G are connected across the terminals of the current transformer.

Motor 110, driving cam 109 of timer G, is connected directly between conductors 101 and 102 so as to be continuously operated.

The solenoid of bleed valve 52 is connectable with conductor 102 through the contacts 108a.

OPERATION

Control of selected condition

Having thus described the nature of the electrical control system, reference will now be made to its operation in controlling the regulating apparatus. For example, if the selected condition falls below normal, contact is made between circuit maker 73 and the contact 71 in the governing instrument 70 energizing the relay 103. This in turn, energizes relay 104 and the solenoid of the three-way valve 44, causing it to operate and the pistons 41 and 24 in the hydraulic mechanism to move to the right. When the relay 103 closes, its pair of contacts 103c complete a holding circuit, holding the relay closed. Contacts 104c of relay 104 also close thus energizing motor 115 of timer F causing cams 114 and 113 to rotate. At the same time, contacts 104b open to stop or prevent independent operation of bleed valve 52 by opening the circuit between the solenoid of relay 108 and contacts of relay 107.

The contact between the contacts 117 of the timer F is held long enough to carry the contact arm 81 of the limit switch D from a stop segment 83 to the adjacent inter-connected segment 82. This maintains the circuit through the limit switch as contact is broken through the timer contacts 117 until the limit switch contact arm reaches the next stop segment 83, which breaks the circuit, causing the valve 44 to become de-energized and the pistons 41 and 24 to stop in their new positions.

This piston movement, as has been described, causes the boiler water to rise to the next higher fixed level. If the resulting increase in power input does not return the selected condition to normal, this operation is repeated on the next closure of contacts 117 in the timer F and the boiler water is carried still higher. When contact in instrument 70 is broken, the next momentary opening between contacts 118 of timer F breaks the holding circuit to relay 103 causing relays 103 and 104 to drop out. Contacts 104a open to preclude operation of valve 44 and the timer motor is stopped on the next opening of contacts 116.

If, on the other hand, the selected condition rises above normal, contact is made between the circuit maker 73 and the contact 72 of the governing instrument 70, energizing relays 105, 106 and the solenoid of the valve 43. This causes the pistons 41 and 24 to move to the left. A similar operation to that described in the previous paragraph causes the boiler water level to be lowered in successive steps until the power input is reduced sufficiently to break contact in the governing instrument 70.

The operation of the timer and the limit switch causes the pistons 41 and 24 to move directly from one stop position to the next without arcing at the regulating instrument contacts or consequent chattering of the relays. The timer cam speed must be such that the boiler water has time to assume that level corresponding with any piston stop position before the pistons are permitted to move to the next. Also, the piston speed, as determined by the throttling adjustment of the valve 45, should be as fast as possible without causing over-travel.

When the relay 106 is energized, its contacts 106b close to energize the relay 108, which in turn energizes the solenoid of the valve 52 causing the latter to open. The relay 108 is held in on a holding circuit through contacts 108c and contacts 111 of timer G. This causes the relay 108 to remain energized and the bleed valve to stay open as long as the selected condition is high, and contact is held between the circuit maker 73 and contact 72 of the governing instrument 70. Bleeding assists in reducing the boiler power input and also permits the minimum possible power input to be taken at the lowest water level. The rate of bleeding, which should not be greater than necessary, as determined by experience, depends on the throttling adjustment of the valve 51. When contact is broken between contacts 106b the next momentary opening between the contacts 111, causes relay 108 to drop out and the bleed valve to close.

If optimum water level is in between two fixed levels, it hunts between them, but, since the bleed valve 52 operates each time the water level is lowered, the higher fixed level is held after two or three cycles, i. e., bleeding reduces the salt concentration in the boiler water, and hence the water level must be raised to maintain the same power input.

Control circuits using alternative timing device

The schematic diagrams, Fig. 5, illustrates the use of an alternative type of timing device H which may replace the device F, and has a different arrangement of contacts and includes two interconnected relays 130 and 140. The relay 130 has a normally open pair of contacts, 130a, replacing the contacts 118, in the holding circuit for relays 103 and 105. The relay 140 has a normally open pair of contacts, 140a, connected in series with circuit maker 73 of regulating instrument 70, also a normally open pair of contacts 140b replacing contacts 117, Fig. 3.

Figure 6:
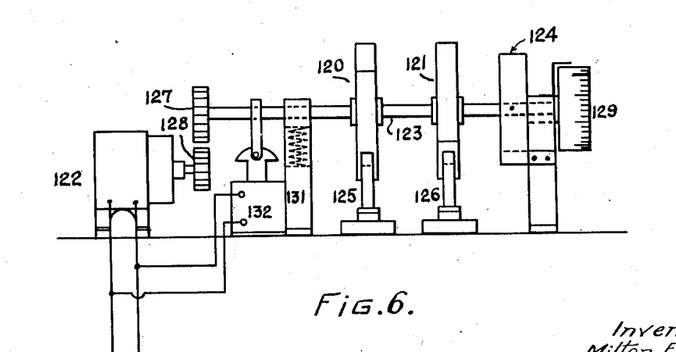
Figure 6 is a diagrammatic view of the timing device used in connection with the system of Figure 5.

The timing device H, Fig. 5, as best illustrated in Figure 6 has two circuit making cams 120 and 121, driven by a motor 122 through a suitable speed reducing unit. The cams are mounted on a common shaft 123 and made to turn through a maximum angle of something less than 360°. When the motor and solenoid 132 are de-energized a spring 124 immediately returns the cams to the starting position. Contacts 125 and 126 are normally closed by the cams 120 and 121. When motor 122 and solenoid 132 are energized the cams begin to rotate, causing contacts 126 to open almost instantly and contacts 125 to open after cam 120 has turned through a predetermined adjustable angular distance. This angular adjustment of cam 120 determines the time period of the device.

In operation, when switch S is closed, relays 130 and 140 become energized and contacts 130a, 140a and 140b close. Now, if the selected condition falls below normal, contact is made between circuit maker 73, of instrument 70, and contact 71 energizing relay 103. Contacts 103c close to form a holding circuit through contacts 130a. Contacts 103a close to energize relay 104. Contacts 104a close operating valve 44 and causing the boiler water level to rise. Contacts 104c close energizing motor 122 of timer H thus causing cams 120 and 121 to rotate. After a brief time interval contacts 126 open thus de-energizing relay 140 and opening contacts 140a and 140b.

This time interval is long enough for contact arm 81 of limit switch D to move to an interconnected segment 82, thus maintaining valve 44 energized until pistons 41 and 24 in the hydraulic mechanism, Fig. 1, move to the position corresponding with the next higher water level at which contact arm 81 reaches the next stop segment and valve 44 is de-energized. With contacts 140a open relay 103 is held in by the holding circuit through contacts 103c and 130a.

When the time period of timer H has elapsed, i. e., when contacts 125 open, relay 130 is de-energized. Contacts 130a open to de-energize relays 103 and 104. The timer motor 122 is de-energized allowing cams 120 and 121 to return to their starting position.

If the rise in water level has not corrected the selected condition, contact will still be maintained in the regulating instrument, consequently, when the timer resets, relays 140 and 130 are again energized closing contacts 130a, 140a and 140b and the above cycle of operation is repeated. The water level rises in steps until the controlled condition is normal.

If the controlled condition rises above normal a similar operation causes the water level to fall in successive timed steps until it is corrected.

The advantage of using the timing device H as compared with the timer F, Figs. 3 and 4, is that the former, with modifications, is, at the present time, standard equipment for other applications and available on the market. The timer used in Fig. 3, would require an adjustable speed motor and would have to be specially built for this particular application. These considerations make the scheme, illustrated in Fig. 5, preferable, under certain conditions, but, under other conditions, the control circuits, Fig. 4, might be preferable on account of requiring fewer relays.

*Control of load current corresponding with boiler water level*

If the boiler load current exceeds, by a predetermined amount, that corresponding with the rated capacity at any water level, the contacts of the relay 107 are caused to close by the current from the current transformer 87 in one of the conductors 13. This operation is predetermined by choice of the ratio of the current transformer and the number of turns between taps on the solenoid of relay 107. In Figure 1, the connection between the transformer and the tap selector switch and the control circuit is indicated by the circle 6.

Since the pull of a solenoid is a function of the solenoid current multiplied by the number of turns in the coil or ampere-turns, the boiler load current required to cause operation of relay 107 depends on the current transformer ratio and the solenoid taps with which it is connected.

As an example it may be assumed that the rated full load boiler current is 1000 amperes, that the current transformer ratio is 300:1 and that on tap 1 relay 107 operates with a current of 1 ampere, on tap 2 a current of 2 amperes causes it to operate, etc. At the lowest operating water level on the electrodes, i. e., when piston 24 is to the left of pipe 20a, the tap selector switch contact arm 90 engages the segment connected with relay solenoid tap 1 and hence a current transformer current of 1 ampere causes relay operation. This corresponds with a load current of 300 amperes. Similarly at the next higher water level a load current of 600 amperes causes relay 107 to operate. The load current required to operate the relay at each water level is respectively 300, 600, 900 and 1200 amperes corresponding with 20% over the rated load for each level.

If six water levels were used the load current, causing relay operation, corresponding with each level would be 200 to 1200 amperes in steps of 200 amperes.

Another means of obtaining variable load current actuation of overcurrent relay is to employ a variable resistance connected across the terminals of the relay solenoid. Resistor taps may be connected with the tap selector switch and resistance values and connections made such that at the lowest water level all of the current from the current transformer passes through the relay solenoid, which may be wound for a circuit closing current of 1 ampere. At the next higher water level the shunt resistance is made to parallel the relay solenoid, and is of such value that when the current transformer current is 2 amperes only one ampere passes through the relay solenoid and the remainder through the resistor. At the next higher level the tap selector switch reduces the shunt resistance so that with 3 amperes from the current transformer only one ampere passes through the relay solenoid, etc. It is obvious that the same results are obtained as with the use of solenoid taps.

When the relay 107 operates it energizes relay 108 to cause operation of the bleed valve 52 and consequent reduction in boiler water salt concentration and load current.

If relay 107 is made to operate with a definite solenoid current it tends to hold in after the current falls considerably below that value. This is avoided by periodic closure of timer G contacts 112 which are shunted across the current transformer during each revolution of the cam 109, momentarily short-circuiting the relay solenoid and permitting the relay to reset. If the boiler load current has fallen sufficiently, the next interruption between the contacts 111 in the holding circuit causes the relay 108 to drop out and the bleed valve 52 to reclose. However, if the load current is still high, relay 107 picks up again thus causing the bleed to continue for at least another holding circuit interruption.

The relay 107 and its associated apparatus thus function to limit the current that can be taken at any boiler water level independently of the controlled condition. This avoids excessive current density on the electrodes and limits the load that can be taken at the highest water level.

ADVANTAGES

This invention offers several advantages, as compared with prior art disclosures. In the first place it is not limited in its application either in the choice of condition desired to be regulated, or by boiler load conditions, such as for instance degree of fluctuation in steam demand and feed water conductivity. The control functions over the full range of boiler load from the greatest that can be taken at the highest practicable water level on the electrodes, to the minimum possible at the lowest water level. Moreover, it utilizes the step method of correction, which is noted for operating stability.

It will be understood that various modifications may be made in this invention without departing from the spirit thereof or the scope of the claims, and therefore the exact forms shown are to be taken as illustrative only and not in a limiting sense, it being desired that only such limitations shall be placed thereon as may be imposed by the state of the prior art or are set forth in the accompanying claims.

The sub-titles used throughout the specification are merely to simplify reference thereto and should otherwise be disregarded.

I claim:

1. In an apparatus for regulating electric steam generators, the combination of an electric boiler, an elevated control tank for controlling the boiler water level, said control tank having a single steam inlet, water communication between the bottom of the control tank and the bottom of the boiler, steam communication between said inlet and a level of the boiler corresponding with a selected operative water level on the boiler electrodes, and a feed water supply for the boiler regulated by the water level in the control tank.

2. In an apparatus for regulating electric steam generators, the combination of an electric boiler, an elevated control tank, adjustable feed means for admitting feed water to the boiler in accordance with the water level in the control tank, said control tank having a single steam inlet, water communication between the bottom of the control tank and the bottom of the boiler, steam communication between said inlet and a level of the boiler corresponding with the selected operative water level on the boiler electrodes, and adjustable means for causing condensation of steam within the control tank at a predetermined adjustable rate.

3. In an apparatus for regulating electric steam generators, the combination of an electric boiler, an elevated control tank, adjustable feed means for admitting feed water to the boiler in accordance with the water level in the control tank, said control tank having a single steam inlet, water communication between the bottom of the control tank and the bottom of the boiler, steam communication between said inlet and a level of the boiler corresponding with a selected operative water level on the boiler electrodes, adjustable means for causing condensation of steam within the control tank at a predetermined adjustable rate, and means for bleeding off from the control tank non-condensible gases.

4. In an apparatus for regulating electric steam generators, the combination of an electric boiler, an elevated control tank, a feed water communication to said boiler, a regulator for said communication responsive to a water level in the control tank, feed water communication with the control tank, adjustable means for throttling said control tank, feed water communication to adjust the rate of condensation of steam within the control tank, water communication between the control tank and the boiler, said control tank having a single steam inlet, and a steam communication between said inlet and a level of the boiler corresponding with a selected operative water level on the boiler electrodes.

5. In an apparatus for regulating electric steam generators, the combination of an electric boiler, an elevated control tank, a feed water communication to said boiler, a regulator for said communication responsive to a water level in the control tank feed water communication with the control tank, adjustable means for throttling said control tank feed water communication to adjust the rate of condensation of steam within the control tank, water communication between the control tank and the boiler, said control tank having a single steam inlet, a steam communication between said inlet and a level of the boiler corresponding with a selected operative water level on the boiler electrodes, and means for bleeding off from the control tank non-condensible gases.

6. In an apparatus for regulating electric steam generators, the combination of an electric boiler, an elevated control tank for controlling the boiler water level, means for admitting steam from the boiler to the control tank only when the boiler water is below a selected operative level, free water communication between the boiler and the control tank, and adjustable feed means for admitting feed water to the boiler in accordance with the water level in the control tank.

7. An apparatus for regulating electric steam generators to maintain a selected condition of operation substantially constant comprising, a boiler, a feed water supply connection to the boiler; water level regulated means including a control tank and apparatus associated therewith for controlling said supply connection to maintain the water in the boiler substantially at a constant level; water level adjusting means including apparatus for establishing communication from the steam space of the control tank with one of a series of different levels of the boiler corresponding respectively with selected operative water levels on the boiler electrodes associated with said water level regulated means to determine the level at which the boiler water is to be maintained; electrical control means for controlling the action of said regulating means, said control means including an instrument responsive to variations in the selected condition for initiating the action of said adjusting means, and means associated with said control means and governed by said water level adjusting means to limit the power that can be taken at any water level.

8. An apparatus for regulating electric steam generators to maintain a selected condition of operation substantially constant comprising, a boiler, a feed water supply connection to the boiler, a control tank, an adjusting cylinder, a connection between the control tank and one end of the cylinder, a series of spaced apart connections from the cylinder to progressively different levels in the boiler, an adjusting piston adapted to travel within the cylinder to connect or disconnect progressively the boiler connections from the control tank connection, a second cylinder having an actuating piston adapted to travel therein, a piston rod linking the two pistons, hydraulic means for operating the actuating piston to move the adjusting piston, electrical means responsive to variations in the gelected condition for initiating the action of said hydraulic means, and means associated with the electrical means and actuated by said hydraulic means for stopping the action of said hydraulic means for definite time intervals.

9. An apparatus for regulating electric steam generators to maintain a selected condition of operation substantially constant comprising, a boiler, a feed water supply connection to the boiler, a control tank, an adjusting cylinder, a connection between the control tank and one end of the cylinder, a series of spaced apart connections from the cylinder to progressively different levels in the boiler, an adjusting piston adapted to travel within the cylinder to connect or disconnect progressively the boiler connections from the control tank connection, a second cylinder having an actuating piston adapted to travel therein, a piston rod linking the two pistons, hydraulic means for operating the actuating piston to move the adjusting piston, electrical controlling means responsive to variations in the selected condition for initiating the action of said hydraulic means, and a limit switch associated with the controlling means and operated by the actuating piston for stopping the action of the hydraulic means independently of the selected condition.

10. An apparatus for regulating electric steam generators to maintain a selected condition of operation substantially constant comprising, a boiler, a feed water supply connection to the boiler, a control tank, an adjusting cylinder, a connection between the control tank and one end of the cylinder, a series of spaced apart connections from the cylinder to progressively different levels in the boiler, an adjusting piston adapted to travel within the cylinder to connect or disconnect progressively the boiler connections from the control tank connection, a second cylinder having an actuating piston adapted to travel therein, a piston rod linking the two pistons, a hydraulic pressure supply, electrically operated valve means connected to said pressure supply and to the second cylinder for operating the actuating piston, an electrical control system including first magnetic switch means controlling the operation of said valve means, a governing instrument responsive to variations in the selected condition and adapted to act on said first switch means to initiate operation of one of said valves, second magnetic switch means associated with said first switch means and governed by the movements of said pistons to stop the operation of the valves.

11. An apparatus for regulating electric steam generators to maintain a selected condition of operation substantially constant comprising, a boiler, a feed water supply connection to the boiler, means for adjusting the water in the boiler to any one of a series of selected levels, means associated with said adjusting means but acting independently thereof to maintain the boiler water substantially constant at one of the selected levels, actuating means for operating said adjusting means, an electric control system and a control power circuit therefor, said system including relays for controlling said actuating means, a governing instrument to initiate the action of the relays in response to variations from the selected condition, holding circuits for the relays including timed circuit-interrupting means and relay contacts, and a limit switch for stopping said actuating means.

12. An apparatus for regulating electric steam generators to maintain a selected condition of operation substantially constant comprising, a boiler, a feed water supply connection to the boiler, a control tank, an adjusting cylinder, a connection between the control tank and one end of the cylinder, a series of spaced apart connections from the cylinder to progressively different levels in the boiler, an adjusting piston adapted to travel within the cylinder to connect or disconnect progressively the boiler connections from the control tank connection, a second cylinder having an actuating piston adapted to travel therein, a piston rod linking the two pistons, a hydraulic pressure supply, electrically operated valve means connected to said pressure supply and to the second cylinder for operating the actuating piston, an electric control system including magnetic switch means controlling the operation of said valve means, a governing instrument responsive to variations in the selected condition adapted to act on said switch means to initiate operation of said valve means, limit switch means associated with said first switch means and governed by the movements of said pistons to maintain and to stop the operation of the valve means.

13. An apparatus for regulating electric steam generators to maintain a selected condition of operation subtantially constant comprising in combination a boiler, water level determining means capable of operating to cause adjustment of the water in the boiler to one of a series of predetermined levels, feed water regulating means causing the water to assume and maintain the level corresponding to the adjustment of said determining means, electric means controlling the operation of said determining means, said electric means including instrumentalities responsive to a change in the selected condition for initiating the operation of the determining means, and means responsive to the operation of the determining means to stop the operation thereof for a definite time interval.

14. An apparatus for regulating electric steam generators to maintain a selected condition of operation substantially constant comprising in combination, an electric boiler, a feed water supply connection to the boiler, water level regulated means for controlling said supply connection to maintain the water in the boiler substantially at a constant level; hydraulically operable water level adjusting means associated with said water level regulated means to determine the level at which the boiler water is to be maintained; solenoid valve means for operating said adjusting means, a control circuit, control relays associated with the circuit for energizing said valve means, a governing instrument for energizing the relays in response to a variation in the selected condition, circuit interrupting means adapted to maintain a temporary holding circuit to maintain said relays energized, a limit switch operable by said adjusting means to maintain another holding circuit to energize said valve means until the next water level is reached and then to cause the valve means to become de-energized.

15. An apparatus for regulating electric steam generators to maintain a selected condition of operation substantially constant, comprising in combination, an electric boiler, a feed water supply connection to the boiler, bleed means for the boiler, water level regulated means for controlling said supply connection; hydraulically operable water level adjusting means arranged to influence said water level regulated means to contribute towards determining the level at which the boiler water is maintained; electrical control means, said control means including an instrument responsive to a variation in the selected condition for initiating the action of said adjusting means and of said bleed valve to lower the boiler water level, said instrument also being responsive to an opposite variation in the selected condition for initiating the action of said adjusting means alone to raise the water level, and means independent of the selected condition for stopping the action of said adjusting means and said bleed means.

16. An apparatus as claimed in claim 15 including electrically operated means for limiting the amount of power that can be taken at any given water level, said electrically operated means including instrumentalities associated with the control means and responsive to fluctuations in the power supply to the boiler for causing operation of said bleed means.

17. An apparatus for regulating electric steam generators to maintain a selected condition of operation substantially constant comprising, a boiler, a feed water supply connection to the boiler; water level regulated means for controlling said supply to maintain the water in the boiler substantially at a constant level; water level adjusting means associated with said water level regulated means to determine the level at which the boiler water is to be maintained; electrical control means for controlling the action of said regulating means, said control means including an instrument responsive to variations in the selected condition for initiating the action of said adjusting means; a bleed valve, bleed valve control means, a tap selector switch for adjusting the current required to operate said bleed valve control means, said selector switch being operable by the movements of said adjusting means to give a definite actuating current for any selected water level, said relay being adapted to close when the current reaches a predetermined value.

18. An apparatus for regulating electric steam generators to maintain a selected condition of operation substantially constant comprising, a boiler, a power supply to said boiler, a feed water supply connection to the boiler, a control tank, an adjusting cylinder, a connection between the control tank and one end of the cylinder, a series of spaced apart connections from the cylinder to progressively different levels in the boiler, an adjusting piston adapted to travel within the cylinder to connect or disconnect progressively the boiler connections from the control tank connection, a second cylinder having an actuating piston adapted to travel therein, a piston rod linking the two pistons, hydraulic means for operating the actuating piston to move the adjusting piston, electrical controlling means responsive to variations in the selected condition for initiating the action of said hydraulic means, a limit switch associated with the controlling means and operated from the piston rod for stopping the action of the hydraulic means independently of the selected condition, a bleed valve, electrically operated bleed valve controlling means, selector switch operated means and associated current transformer making said bleed valve controlling means responsive to predetermined values of boiler load current, said selector switch being operated by the piston rod to vary the actuating current according to the water level, said bleed valve controlling means being rendered operable when the boiler current reaches a certain limit corresponding with the boiler water level.

19. In an apparatus of the type described, the combination of an electric boiler and instrumentalities for the step by step adjustment of the boiler water level at any one of a series of selected levels, motor operated means for controlling said instrumentalities, electrical means controlling the motor operated means and including magnetic relay means having a plurality of contacts, a governing instrument responsive to changes in a selected condition, circuit holding means actuated by a motor, a limit switch, a circuit through the governing instrument to energize the relay means, a holding circuit through contacts of the relay means and the circuit holding means to govern the relay means, a circuit through contacts of the relay means and through the circuit holding means to energize said electrical means, a circuit through the limit switch to energize said electrical means, and control power connections to said circuits.

20. An apparatus for regulating electric steam generators comprising in combination, an electric boiler, instrumentalities for effecting a step by step adjustment of the boiler water through a series of fixed levels, means responsive to a change in the selected condition for initiating the action of said instrumentalities, means independent of the selected condition for stopping said instrumentalities for a definite period at the conclusion of each step, and means for maintaining the water level substantially constant at one of the fixed levels while the selected condition remains normal.

21. In an apparatus of the type described, an electric boiler and instrumentalities for bringing about a step by step adjustment of the boiler water level, a governing instrument responsive to changes in a selected condition, relays rendered operable by the governing instrument, electrically operable regulating valves for actuating said instrumentalities, timed holding circuits for maintaining the operation of the regulating valves, and means responsive to the water level in the boiler for breaking one of said holding circuits to stop the operation of the adjusting valves for a definite time interval.

22. In an apparatus of the type described, an electric boiler and instrumentalities for bringing about a step by step adjustment of the boiler water level, a governing instrument responsive to changes in a selected condition, relays rendered operable by the governing instrument, electrically operable regulating valves for actuating said instrumentalities, timed holding circuits for maintaining and precluding the operation of the regulating valves, and means actuable by said instrumentalities for breaking the holding circuit to stop the operation of the regulating valves.

23. An apparatus for regulating electric steam generators to maintain a selected condition of operation substantially constant comprising in combination, an electric boiler, a feed water supply connection to the boiler, water level regulating means for controlling said supply connection including an elevated control tank, water communications between the boiler and the control tank, and means for admitting steam to the control tank when the water falls below a selected level to be maintained; hydraulic water level adjusting means associated with said water level regulating means to determine the level at which the boiler water is to be maintained; electrical control means, said control means including an instrument responsive to a variation in the selected condition for initiating the action of said adjusting means, and means independent of the selected condition for stopping the action of said adjusting means.

24. An apparatus for regulating electric steam generators to maintain a selected condition of operation substantially constant comprising, a boiler, a feed water supply connection to the boiler, water level regulating means for controlling said supply connection including an elevated control tank, water communications between the boiler and the control tank, and means for admitting steam to the control tank when the water falls below a selected level to be maintained; water level adjusting means acting on said water level regulating means to determine the level at which the boiler water is to be maintained; electrical control means for controlling the action of said regulating means, said control means including an instrument responsive to variations in the selected condition for initiating the action of said adjusting means, and means actuated by said water level adjusting means for stopping the action of said adjusting means.

MILTON EATON.